(12) United States Patent
Nielsen

(10) Patent No.: US 10,012,524 B2
(45) Date of Patent: Jul. 3, 2018

(54) SPLIT WATER METER BOX LID

(71) Applicant: DFW PLASTICS, INC., Bedford, TX (US)

(72) Inventor: Jeffrey N. Nielsen, College Station, TX (US)

(*) Notice: Subject to any disclaimer, the term of this patent is extended or adjusted under 35 U.S.C. 154(b) by 0 days.

(21) Appl. No.: 15/160,953

(22) Filed: May 20, 2016

(65) Prior Publication Data
US 2017/0336236 A1  Nov. 23, 2017

(51) Int. Cl.
*B65D 88/76* (2006.01)
*G01F 15/14* (2006.01)

(52) U.S. Cl.
CPC .................. *G01F 15/14* (2013.01)

(58) Field of Classification Search
CPC ...... B65D 2583/0454; B65D 2590/662; B65D 25/44; E02D 29/12
USPC .............................................. 220/484, 254.9
See application file for complete search history.

(56) References Cited

U.S. PATENT DOCUMENTS

| | | | | |
|---|---|---|---|---|
| 3,501,874 A | * | 3/1970 | Hahne ..................... | G01F 15/12 404/25 |
| 3,904,524 A | * | 9/1975 | Pelton ................ | B01D 17/0208 210/170.01 |
| 3,952,908 A | * | 4/1976 | Carson ..................... | H02B 1/06 220/3.8 |
| 4,065,020 A | * | 12/1977 | Carson ................... | B65D 39/08 220/293 |
| 6,968,969 B1 | * | 11/2005 | McKinnon, Jr. ...... | G01F 15/063 220/484 |
| 7,385,137 B2 | | 6/2008 | Burke et al. | |

* cited by examiner

*Primary Examiner* — Shawn M Braden
(74) *Attorney, Agent, or Firm* — Geoffrey A. Mantooth; Brian K. Yost

(57) ABSTRACT

A meter box and lid unit has a meter box. The meter box has end walls and opposing side walls, an interior cavity and an opening. A lip extends along the walls. The lip has notches therein. The lid has a first portion and a separate second portion, the first and second portions covering the opening when the lid bears the lip. The first portion has a receptacle for receiving a transmitter. The first portion has retainers depending therefrom. The first portion is capable of moving from a first position to a second position, wherein when the first portion in the first position, the retainer and the notch are aligned and the first portion can be removed from the box. With the first portion in the second position, the retainer cooperates with the lip to retain the first portion on the lip. With the first portion in the second position, the second portion can be removed from the box while the first portion is retained thereon.

9 Claims, 5 Drawing Sheets

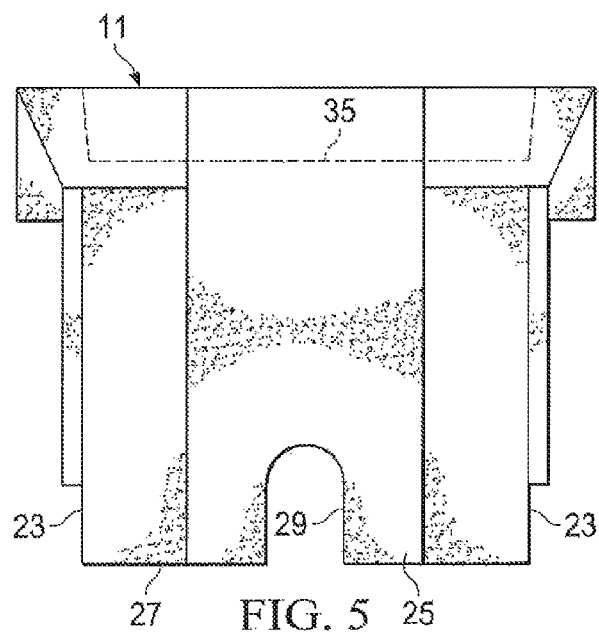
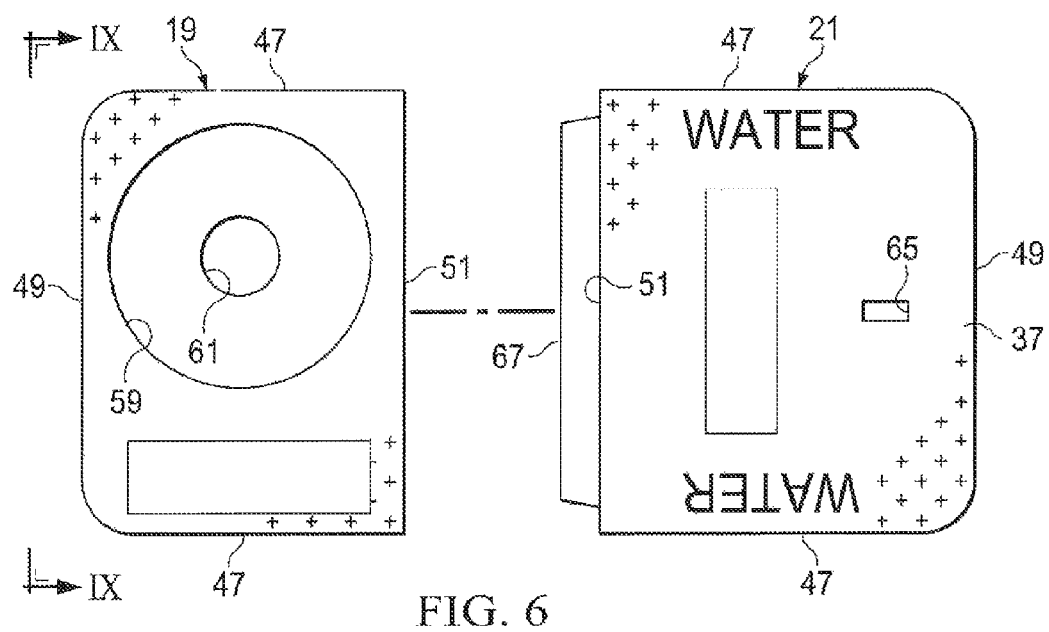
FIG. 5
FIG. 6

SPLIT WATER METER BOX LID

FIELD OF THE INVENTION

The present invention relates to utility boxes for water meters and the lids therefore.

BACKGROUND OF THE INVENTION

Water meters are typically located in the ground with the water service line. In residential areas, water meters are typically located in the front yard neat the street or in the backyard near the alley. Periodic access to the water meters is required for billing purposes.

The water meters are housed in a box. The box provides vertical walls. A lid covers the top of the box. The lid is flush to or slightly below the ground.

Many utility companies use automated meter reading (AMR). A water meter is equipped with a radio transmitter, sometimes referred to as in ERT (encoder-receiver-transmitter). The transmitter is connected to the meter, with the meter being in line with the service line or pipe. The transmitter is mounted to the lid on the box. A reader from the utility company passes near the lid and water usage information is transmitted by the transmitter to the reader. The reader can be hand held or located in a vehicle driven along the street or alley.

Even with the transmitter in place, access to the water meter box interior is required. Frequently, access to a cutoff valve located in the meter box may be required to control the supply of water. Also, access to the transmitter may be required from time to time for maintenance, such as changing the batteries.

When accessing the interior of the meter box, damage to the transmitter may occur. The transmitters are connected to the meters by way of wires. When the lid is removed from the box, if care is not taken, the wires can be yanked loose from the meter, thereby disabling the operation of the transmitter.

Thus, it is desirable to allow access to the interior of the meter box while minimizing damage to the transmitter and its connection to the meter.

SUMMARY OF THE INVENTION

The present invention provides a meter box and lid unit, that comprises a meter box having end wails and opposing side wails. Each side wall extends between the end walls. The end and side walls form an interior cavity. The meter box comprises an opening that communicates with the interior cavity. The meter box has a lip extending along the side walls. The lip has at least one notch therein. The lid comprises a first portion and a separate second portion. The first and second portions cover the opening when the lid bears on the lip. The first portion has a receptacle for receiving a transmitter. The first portion has at least one retainer depending therefrom. The first portion is capable of moving from a first position to a second position, wherein when the first portion is in the first position, the retainer and the notch are aligned and the first portion can he removed from the box. When the, first portion is in the second position, the retainer cooperates with the lip to retain the first portion on the lip. When the first portion is in the second position, the size of the opening is reduced. The second portion is located in the reduced opening when the first portion is located in the second position.

In one aspect, a surface area of the second portion is larger than a surface area the first portion.

In still another aspect, the surface area of the second portion is at least fifty per cent larger than the surface area of the first portion.

In still another aspect, the retainer is fixed.

In still another aspect, wherein the retainer is a first retainer, further comprising a second retainer. The second retainer cooperates with a lip attached to one of the end walls of the box when the first portion is in the second position.

In still another aspect, the notch is locater to one of the end walls than to the other of the end walls.

In still another aspect, the second portion moves between the first and second positions by sliding on the lip.

BRIEF DESCRIPTION OF THE DRAWINGS

FIG. 5 is an end elevational view of the box.

FIG. 6 is an exploded top view of the lid.

DESCRIPTION OF THE PREFERRED EMBODIMENT

Figure 1:
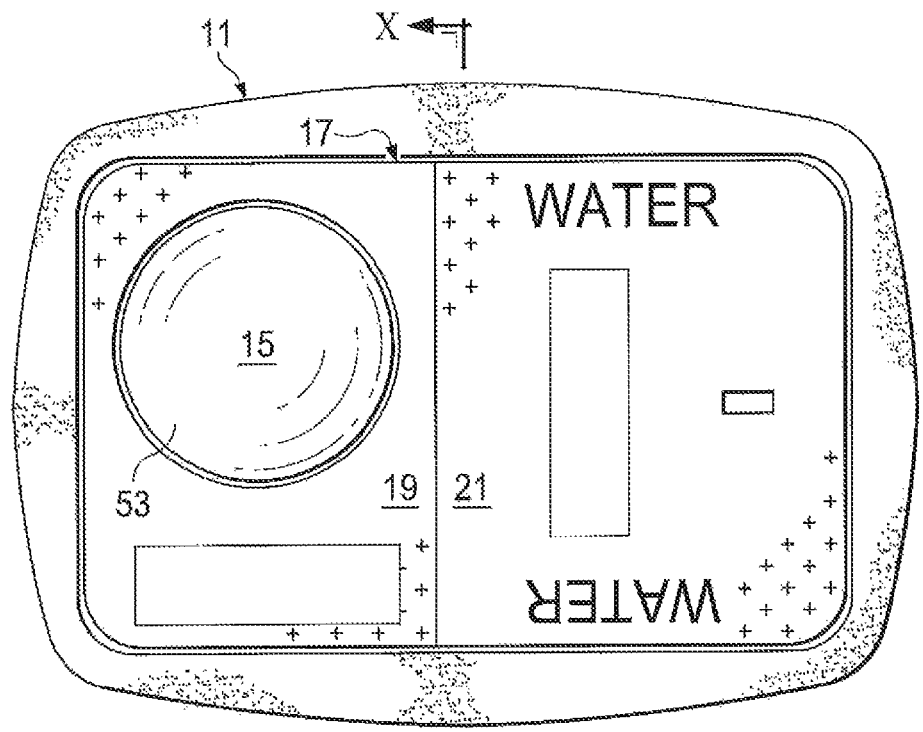
FIG. 1 is a top plan view of a water meter box and lid, in accordance with a preferred embodiment.
Figure 2:
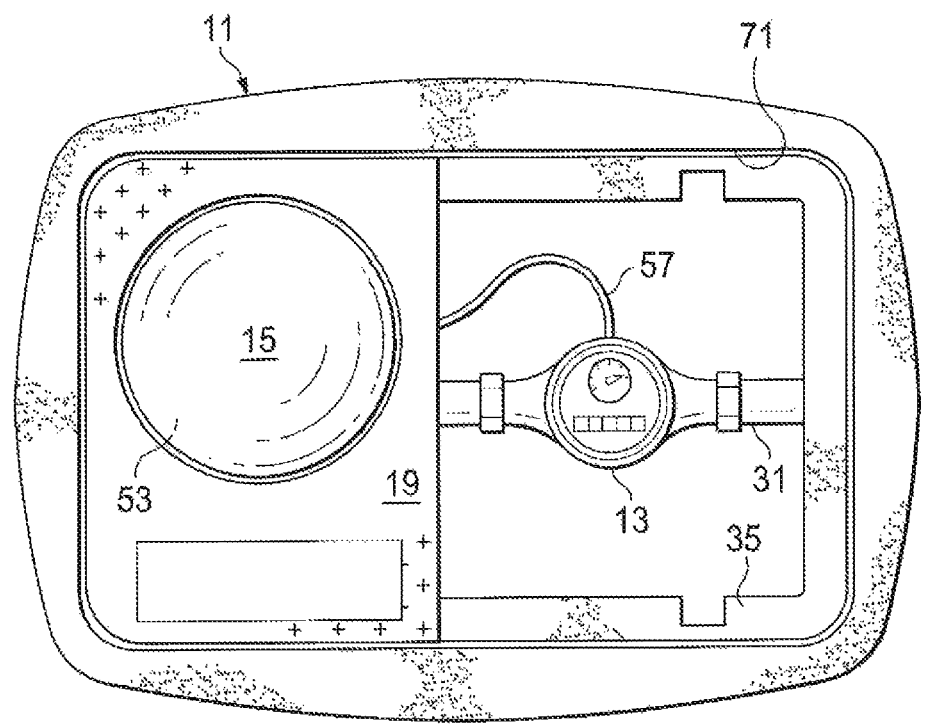
FIG. 2 is a top plan view of the water box, with a portion of the lid removed.
Figure 3:
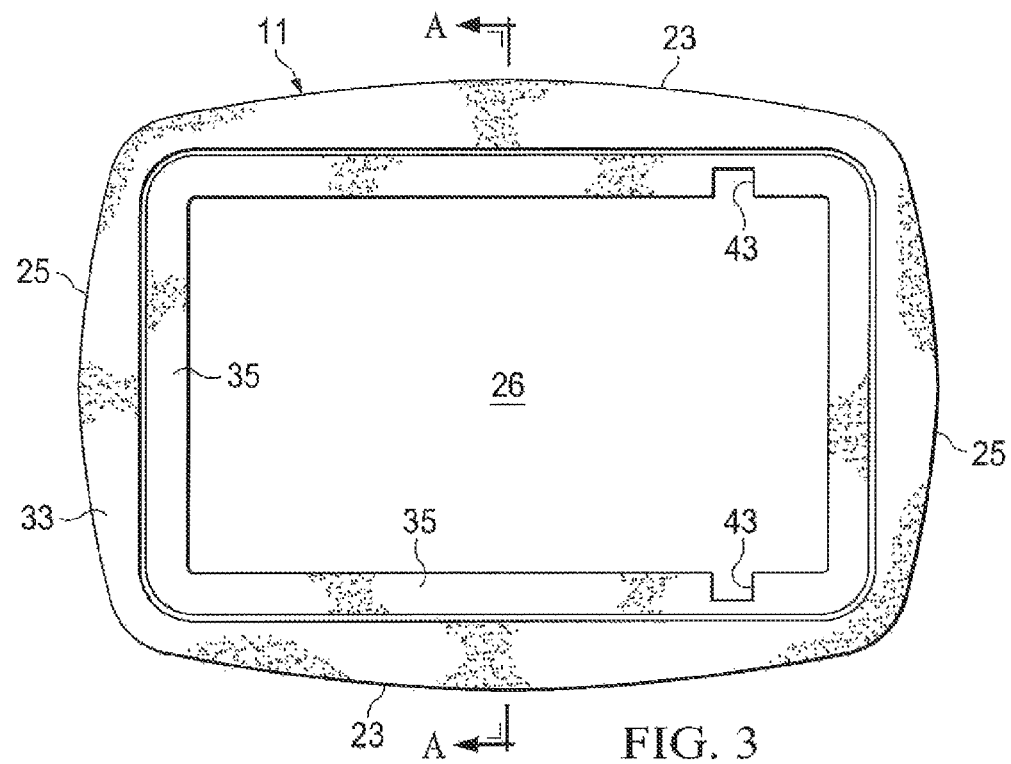
FIG. 3 is a top plan view of the box.
Figure 4:
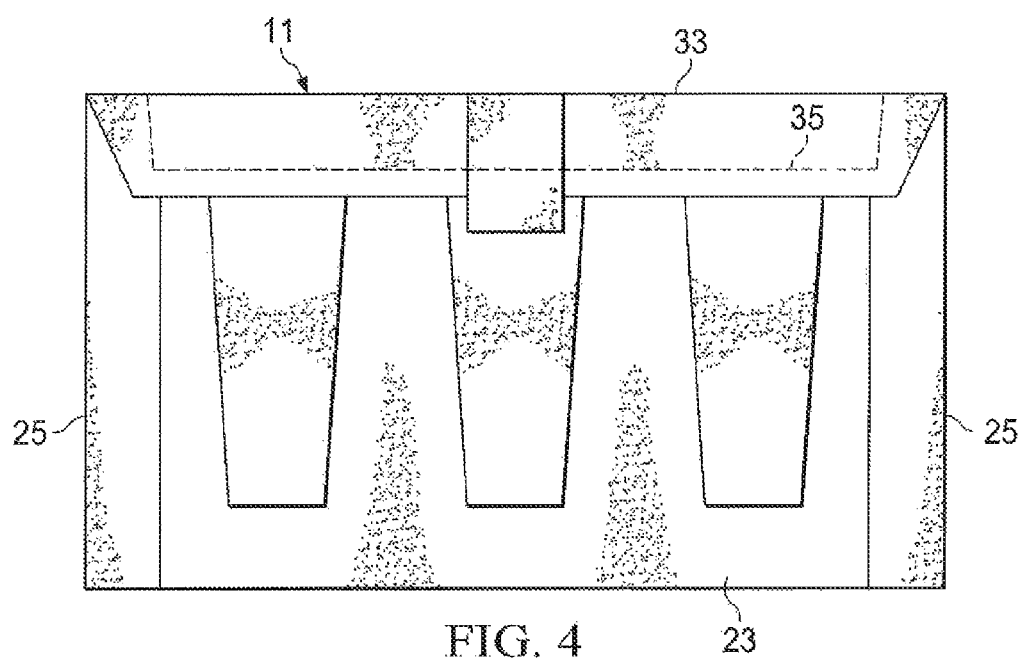
FIG. 4 is a side elevational view of the box.
Figure 10:
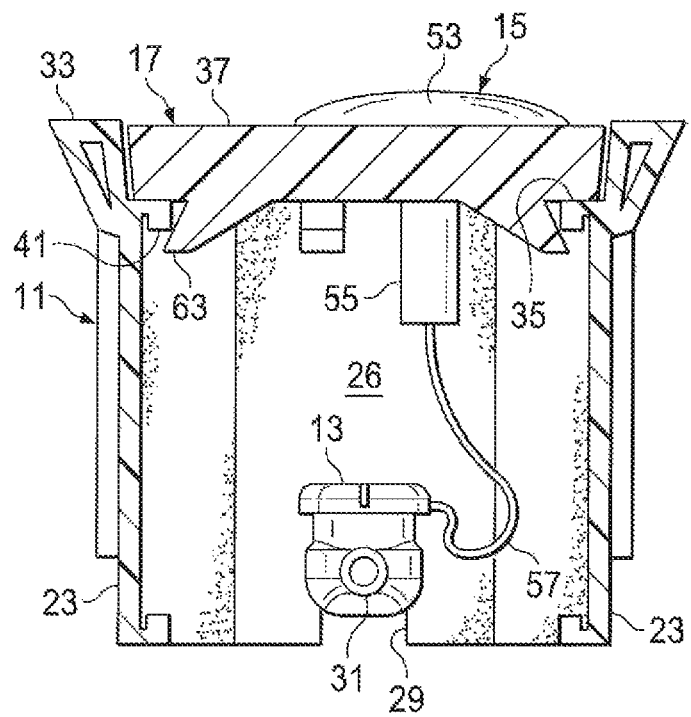
FIG. 10 is a cross-section view of the meter box and lid, taken through lines X-X of FIG. 1, and showing a water meter and transmitter therein.

In FIGS. 1, 2 and 10, there is shown a water meter box 11. The box, which is located in the ground, houses a water meter 13. A transmitter 15, or ERT, is connected to the water meter by way of wires 57. The transmitter is mounted to a lid 17, which lid is used to cover the top of the box 11, shown in FIG. 1.

The lid 17 is in plural pieces or portions. One lid portion 19 has the transmitter 15. The other lid portion 21 is not connected to the transmitter and can be removed from the box without disturbing the transmitter (see FIG. 2). Thus, access to the interior of the box is available by way of the other lid portion 21. This split lid arrangement maintains the status quo of the water meter and transmitter, as the transmitter and its wires are not disturbed by removal of a portion of the lid.

The box 11 and the lid 17 will now be described in more detail.

The box 11 is shown in FIGS. 1-5. The box is generally rectangular in shape. It has four walls, namely side walls 23 and end walls 25. The side walls 23 are longer than the end walls 25. The walls 23, 25 form an interior cavity 26. Meter boxes typically do not have a bottom wall. Instead, the bottom edges of the end walls have notch 29 therein. The box 11 is placed in a pit in the ground over the water meter 13. The water meter is connected to the water service line 31, which line is located in the notches 29.

The box 11 has a top edge 33 that is flat. An opening occurs at the top portion of the interior cavity 26, which opening communicates with the interior cavity and the exterior of the box. Below the top edge 33 is a lip 35 for supporting the lid. The lip 35 is located a distance below the top edge 35 of the box. This allows a top surface 37 of the lid 17 to be flush with the top edge 33 of the box. The lip 35 projects from the side and end walls 23, 25 into the interior 26 of the box. The lip 35 has a top surface 29 and a bottom 41, as shown in FIG. 10. The lip can be continuous as shown, or discontinuous. For example, the lip can extend only along the side walls, or alternatively the lip can extend all the walls, but not extend into the corners, where the walls meet.

The lip 35 has notches 43 (See FIG. 3) therethrough for cooperating with the lid. In the preferred embodiment, there are two notches 43, opposite one another, along the portion of the lip 35 on the side walls 23. Also in the preferred embodiment, the notches 43 are closer to one end wall 25 than the other end wall. For example, referring to FIG. 3, in imaginary line A bisects the side walls 23. The notches 43 are located between this imaginary line A and one of the end walls. In the preferred embodiment, the notches 43 are located closer to one end wall than to imaginary line A.

The meter box is made of plastic and can be made by rotational molding, injection molding, etc.

Referring to FIGS. 6-9, the lid 17 is generally rectangular and sized so as to fit on the lip 35 of the box. The thickness of the lid 17 is such that the top surface is flush with the top edge 33 of the box 11. The lid 17 has a bottom surface 45. The lid also has side edges 47 and end edges 49.

The lid 17 is divided in to pieces or portions. The dividing line between the portions extends between the two side edges 47. Thus, each portion has an end edge 49 and two side edges 47. The side edges and end edges are slightly beveled inwardly from the top surface to the bottom surface. This eases the installation of the lid into the meter box. In addition, each portion has an inside edge 51, along the dividing line. To make up the complete lid, the inside edges 51 are butted together.

Lid 17 has a transmitter portion 19 and an access portion 21. The transmitter portion 19 holds the transmitter 15, while the access portion 21 can be removed from the box without disturbing the transmitter 15.

In the preferred embodiment, the transmitter 15 is shaped somewhat like a mushroom, having a head 53 and a stem 55 (See FIG. 10). The stem 55 depends from the head 53 into the box interior 26. The head 53 is held or retained by the lid transmitter portion 19. Wires 57 extend from the stem 55 and are connected with the meter 13 in the box interior.

With this type of transmitter, the upper surface of the lid transmitter portion 19 has a receptacle or cavity 59 for the transmitter head 53. An opening 61 extends through the lid at the receptacle 59 to the inside or bottom surface. The opening 61 receives the stem 55.

The lid transmitter portion 19 has retainers 63 that depend from the bottom surface 45 and extend out toward the respective edge 47, 49. In the preferred embodiment, there are two opposing retainers beneath the side edges 47 and one retainer beneath the end edge 49. The retainers 63, or hooks, engage the box lip 35 when the lid transmitter portion 19 is located on the lip 35. The distance between the side edge retainers 63 and the respective inside edge 51 is less than, or the same as, the distance between the notches 43 and the nearest endwall 25. This ensures that the lid transmitter portion can be located on and removed from the box and lip.

Figure 9:
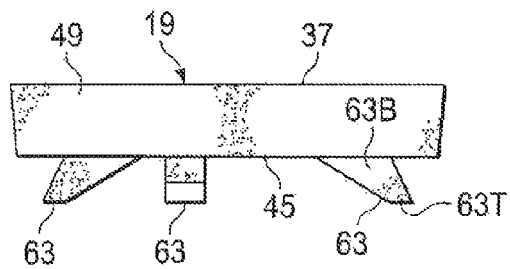
FIG. 9 is an end view of the lid taken through lines IX-IX of FIG. 6.

In the preferred embodiment, the retainers 63 are projections that extend down from the underside of the lid transmitter portion. The retainer projections extend down and out toward the outer perimeter of the lid access portion. In side view, such as is shown in FIG. 9, each retainer 63 is trapezoidal in shape, with a wide base 62B coupled to the underside of the lid access portion, and a narrower tip 63T, which is the free end. The retainer appears to project diagonally from the lid transmitter portion.

Figure 7:
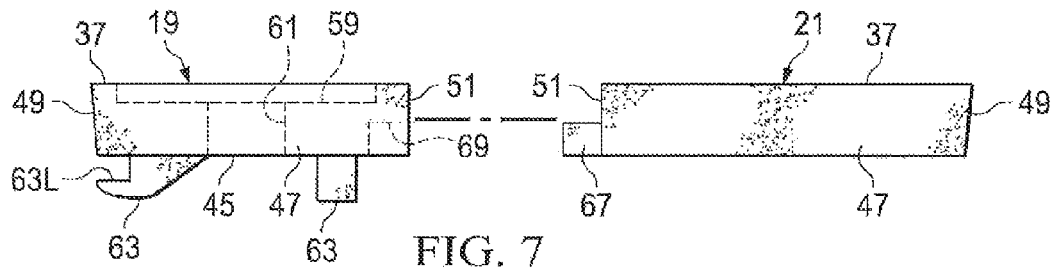
FIG. 7 is an exploded side view of the lid.
Figure 8:
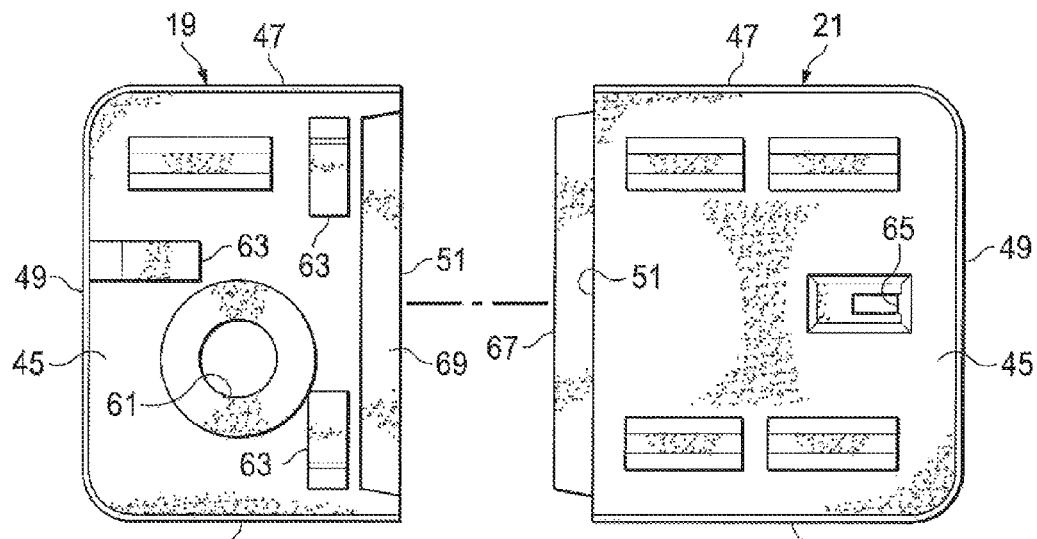
FIG. 8 is an exploded bottom view of the lid.

The retainer can be provided without a lip, such as shown in FIG. 9, or with a lip 63L, such as shown in FIG. 7.

The retainer is particularly suitable for a lid that is compression molded.

The lid transmitter portion 19 can accommodate other types of transmitters. For example, some transmitters can be mounted to the bottom surface 45 of the lid transmitter portion. Thus, the receptacle can vary according to the specific transmitter. For example, a holder or shelf can be provided on the underside of the lid transmitter portion 19 to retain the transmitter thereto. Alternatively, instead of being mounted to the top or bottom sides, the transmitter can be located in a cavity in one of the edges of the lid.

The lid access portion 21 has a port 65 therethrough. The port receives a tool for lifting the access portion 21 up and out of the box.

The lid transmitter and access portions 19, 21 form a complete lid 19 when the respective inside edges 51 are adjacent to each other, as shown in FIG. 1. The inside edges 51 can be flat. In preferred embodiment, the inside edges 51 cooperate with one another by way of a tongue 67 and groove 69. One of the lid portions has a groove 69, while the other lid portion has a corresponding tongue 67. Both the tongue 67 and the groove 69 have beveled ends for aligning the two lid portions 19, 21 with respect to one another. In the preferred embodiment, to minimize collection or debris, the groove 69 is open to the bottom surface of the lid. Likewise, the tongue extends from the bottom surface of the lid of the corresponding lid portion (Sec FIG. 7). The tongue and groove can be continuous as shown, or, discontinuous, with plural teeth and corresponding grooves or receptacles.

Also in the preferred embodiment, the lid access portion 21 is larger than the lid transmitter portion 19 in terms of top surface area. In the preferred embodiment, the top surface area of the lid access portion 21 is at least 1.8 times larger than the top surface area than the lid transmitter portion 19. This allows a relatively large access opening into the box interior to be uncovered when, the lid access portion is removed.

The lid portions 19, 21 are preferably made of plastic and can be manufactured using several techniques. For example, the lid portions can be compression molded. A compression molded lid is heavy and durable, yet transparent to the radio signals needed to communicate to and from the transmitter 15. Alternatively, the lid portions could be injection molded. The lid portions could be made with different processes. For example, the lid transmitter portion could be injection molded, and the lid access portion could be compression molded.

The installation and use of the box and lid will now be described. The box 11 is oriented relative to the earthen pit containing the water meter 13 and the notches 29 of the box are aligned with the water line 31. The box is then lowered into the pit. The transmitter is installed into the lid transmitter portion 19. For a mushroom shaped transmitter as shown, the stem 55 is inserted through the opening 61 and the head 53 located in the recess 59. The lid transmittal portion 19 is then installed in the box by aligning the side retainers 63 with the lip notches 43 and allowing the lid to fall on the lip 35. The lid transmitter portion 19 is then slid on the lip 35 to the opposing end of the box. The retainers allow such sliding motion and move along the underside of the lip 35. The midmost retainer 63 engages the lip at the end wall. This creates an access opening 71. (See FIG. 2) In the interior of the box, wires 57 are connected from the transmitter 15 to the water meter 13. Once the transmitter is successfully connected, the lid access portion 21 is oriented over the access opening 71 and the tongue 67 aligned with the groove 69. Then, the lid access portion is allowed to fall into place on the lip 35. When successfully installed, both lid portions 19, 21 are on the lid 35. The top surface of the lid is flush with the top surface of the box in the ground to minimize tripping hazards.

The lid access portion 21 has no retainers 63, since the lid access portion cannot slide once in place on the box.

After installation, to access the box interior, the lid access portion is removed. A lifting tool is inserted into the port 65 and the lid access portion is lifted off the lip 35 to create the access opening 71. Removing the lid access portion 21 occurs independently of the transmitter 15 and the lid transmitter portion 19. The transmitter 15 and the lid transmitter portion 19 remain undisturbed and in place and the wires 57 connecting the transmitter to the water meter remain intact and connected.

Attempts to raise the lid transmitter portion 19 off of the box lip would be unsuccessful because the retainers 63 hold the lid transmitter portion in place. The retainers prevent the lid transmitter portion 19 from being lifted off of the lip 35, but allow the lid transmitter portion to slide along the lip. Thus, to remove the lid transmitter from the box, the lid transmitter portion is slid on the lip until the retainers 63 align with the notches 43, wherein the lid transmitter portion can he lifted off of the box.

Figure 11:
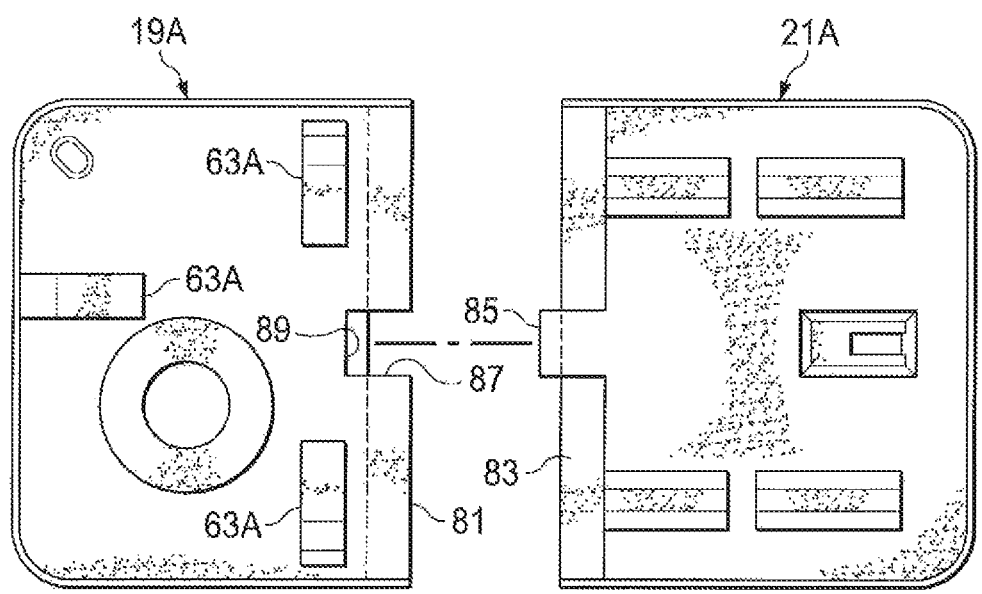
FIG. 11 is an exploded bottom view of the lid, in accordance with another embodiment.

FIG. 11 shows another embodiment of the lid. The lid transmitter portion 19A is provided with a tongue 81 and the lid access portion 21A is provided with a groove 83 on the underside thereof. In addition, the lid access portion 21A is provided with a tab 85, which projects out of the groove.

When the two lid portions 19A, 21A are located on the box, the tab 85 is received by an opening 87 in the tongue 81. The opening 87 extends through the tongue and forms an undercut 89 into the bottom surface of the lid transmitter portion.

The opening 87 effectively divides the tongue into two. The tab is received by the opening in the true and forms an interlock.

Although the lid has been shown with a single transmitter, plural transmitters can be provided on the single lid transmitter portion. For example, if a meter pit contains two water meters, then two transmitters are needed, one for each water meter.

The foregoing disclosure and the showings made in the drawings are merely lessertive of the principles of this invention and are not to be interpreted in a limiting sense.

The invention claimed is:

1. A meter box and lid unit, comprising:
   a) A meter box having end walls and opposing side walls, with each side wall extending between the end walls, the end and side walls forming an interior cavity;
   b) The meter box comprising an opening in a top portion, the opening communicating with the interior cavity, the meter box having a lip extending along each of the side walls;
   c) The lip having at least one notch therein;
   d) The lid comprising a first portion and a separate second portion, the first and second portions covering the opening when the lid bears on the lip;
   e) The first portion, having a receptacle for receiving a transmitter, the first portion having at least one fixed retainer depending therefrom, the first portion capable of sliding from a first position to a second position, wherein when the first portion is in the first position, the retainer and the notch are aligned and the first portion can be removed from the box, and when the first portion slides along the lip from the first position to the second positon, the retainer engages an underside of the lip, when the first portion is in the second position, the retainer cooperates with the lip to retain the first portion on the lip and on the box, when the first portion is in the second position, the size of the opening is reduced;
   f) The second portion is located in the reduced opening when the first portion is located in the second position.

2. The meter box and lid unit of claim 1, wherein a surface area of the second portion is larger than a surface area the first portion.

3. The meter box and lid unit of claim 2, wherein the surface area of the second portion is at least fifty per cent larger than the surface area of the first portion.

4. The meter box and lid unit of claim 1, wherein the retainer is a first retainer, further comprising a second retainer, the second retainer cooperating with a lip attached to one of the end walls of the box when the first portion is in the second position.

5. The meter box and lid unit of claim 1, wherein the notch is located nearer to one of the end walls than to the other of the end walls.

6. The meter box and lid unit of claim 1, wherein one of the first portion or the second portion has a tongue and the other of the first portion or the second portion has a groove, the other of the first portion or the second portion having a tab projecting from the groove and being received by an opening in the tongue.

7. The meter box and lid unit of claim 1, wherein the retainer extends diagonally from an underside of the first portion.

8. The meter box and lid unit of claim 7, wherein the retainer has a base that is coupled to the first portion and a free end, the base being larger than the free end.

9. The meter box and lid unit of claim 1, further comprising a transmitter located in the receptacle of the lid first portion.

* * * * *